O. LAUBER.
FLUID BRAKE.
APPLICATION FILED OCT. 29, 1908.
988,789.
Patented Apr. 4, 1911.
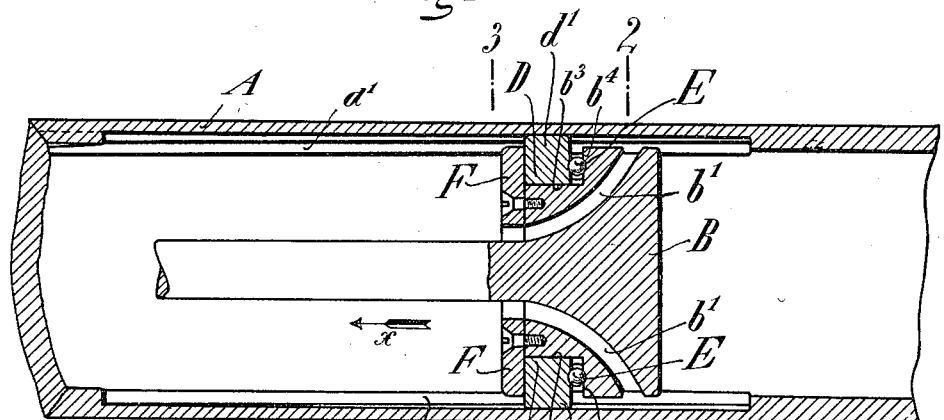
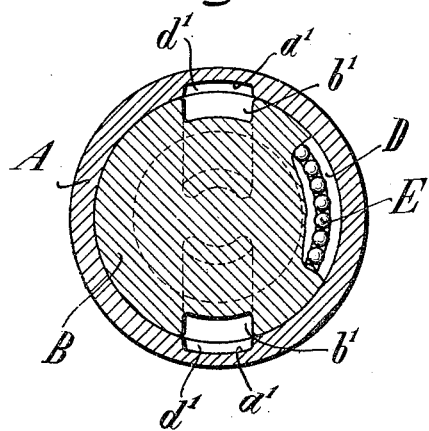
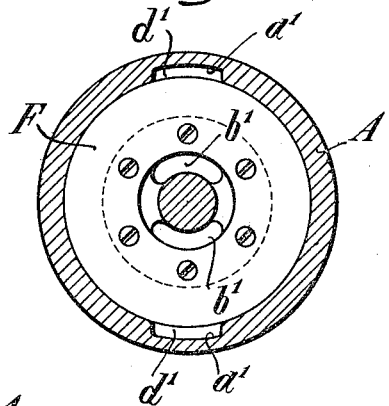
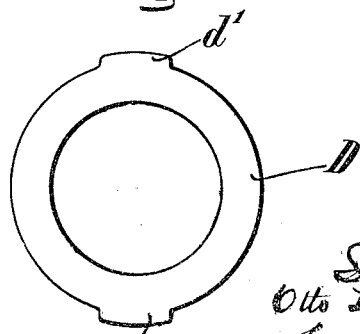
Witnesses
J. M. Wynkoop
Ida J. Stanley
Inventor
Otto Lauber
By Knight Bros
attys

UNITED STATES PATENT OFFICE.

OTTO LAUBER, OF ESSEN-ON-THE-RUHR, GERMANY, ASSIGNOR TO FRIED. KRUPP AKTIENGESELLSCHAFT, OF ESSEN-ON-THE-RUHR, GERMANY.

FLUID-BRAKE.

988,789.  Specification of Letters Patent.  Patented Apr. 4, 1911.

Application filed October 29, 1908. Serial No. 460,130.

*To all whom it may concern:*

Be it known that I, OTTO LAUBER, a subject of the Emperor of Germany, and a resident of Essen-on-the-Ruhr, Germany, have invented certain new and useful Improvements in Fluid-Brakes, of which the following is a specification.

The present invention relates to those types of fluid-brakes for guns, in which the piston is provided with a part which is rotatable relatively to the piston-body and engages with a part that causes the relative rotation during the piston-movements corresponding to the recoil and running out movements of the gun. This condition is met with, for example, in fluid-brakes wherein throttling is effected by extending the by-pass through both the rotating and a non-rotating part of the brake, and gradually varying the by-pass, by the relative movement of the rotary part; such relative rotary movement being effected, for example, by having a projection on the rotatable part engage in a curved guide-groove in the brake-cylinder proper or in a guide-rod secured centrally in the brake-cylinder. The conditions with which the present invention is concerned may also be encountered in that type wherein the by-pass formed through the non-rotating part of the piston, does not open directly into the fluid chamber, but into the internal groove in the cylinder or a surface groove in the guide-rod referred to, so that such groove must form a part of the by-pass, and which groove, by its inclination to the direction of the piston's movement, gradually changes its degree of coincidence with the by-pass in the piston, and thereby throttles the flow of liquid. In this latter type, a portion of the piston projects into the groove to close it against escape of fluid around the piston and since this groove in which the projection travels, is inclined to the direction in which the piston travels, the projection is necessarily carried by a rotatable part of the piston. In each of the types mentioned, the projection slides along the walls of the guide-groove during the relative longitudinal movement of the piston and the brake-cylinder.

The rotatable piston-part, even though exposed to fluid pressure only to the extent of the projections engaging in the guide grooves, will be pressed, during the entire braking movement, with great force against its counterbearing on the piston or piston rod. This produces great friction between the contacting surfaces of the rotatable piston-part and its resisting bearing, with the effect, among others, of causing the rotatable piston-part to offer large resistance to its rotation by the projections sliding in the guide-grooves. The projections of the rotatable piston-part will, therefore, likewise be pressed with considerable force against the appurtenant walls of the guide-grooves and considerable friction is, therefore, also produced between these parts of the fluid-brake.

The combined friction on the piston and in the guide-grooves is not undesirable as regards the action of the brake, as the friction increases the braking resistance in a welcome manner. Furthermore, there would be no reason for decreasing the friction because it causes wear of the rotatable piston-part and its resisting bearing, as there is no objection to making the contacting surfaces of these parts so great that the wear on the surfaces remains within permissible limits. However, the case is different with the projections of the rotatable piston-part and their guide-grooves since the contacting surfaces of these parts must be comparatively small because the guide-grooves generally have small depth. In fact, the friction between these parts may cause the contacting surfaces to become worn to such an extent that intermediate spaces are produced between the projections of the rotatable piston-part and their guide-grooves. These intermediate spaces remain open throughout the braking path and in an undesirable manner increase the passages proper for controlling the flow of the fluid. In case of great wear, these intermediate spaces may have the effect that the forces effecting the recoil and return to battery do not become entirely absorbed, thus causing a shock to take place at the end of the recoil or the return movement. The enlargement of the passages which is caused by wear is especially disadvantageous in brakes with variable length of recoil because, when the brake is adjusted to a short recoil, the moving parts do not come to a stand-still until the openings for the circulation of fluid from one side of the piston to the other are entirely closed. If, for structural reasons, the projections of the rotatable piston-part must be very narrow, the friction between the rotary part and the piston may even cause complete destruction of the projections.

The object of the present invention is to remove the drawbacks pointed out in the foregoing. This object is attained by interposing anti-friction means, such for instance as a circular row of balls or the like, between the rotatable piston-part and at least that surface which acts as resisting bearing for the rotatable part during recoil.

In the accompanying drawing, the invention is embodied under conditions which render it effective during recoil, by way of example; the invention being applied for purposes of illustration to the fluid-brake forming the subject matter of the copending application of Otto Lauber and Norbert Koch, filed April 30, 1907, Serial No. 371,078, wherein the braking fluid flows from the fluid chamber on one side of the piston through a passageway formed in the non-rotating part of the piston.

Figure 1 is a longitudinal section through the piston and a part of the brake-cylinder; Fig. 2 is a section on line 2—2, Fig. 1, looking from the right; Fig. 3 is a section on line 3—3, Fig. 1, looking from the left, and Fig. 4 is a detail of the piston.

In the construction of recoil brake selected for illustrating my invention, A represents a brake-cylinder, and B represents the piston fitted in said cylinder. The piston B moves rearward in the direction of the arrow $x$, when the gun recoils, so that fluid in the rear chamber must escape past the piston, to the front chamber. When the gun returns to battery, the flow is reversed, passing from the forward chamber to the rear chamber. To permit such flow, yet restrict it sufficiently to impose necessary resistance to recoil, the piston B is constructed with ducts $b^1$, $b^1$. In order to throttle the fluid passing through these ducts, grooves $a^1$, $a^1$, are provided in the inner wall of the cylinder, and the ducts are made to open into these grooves, and through them communicate with the forward chamber, and said grooves are inclined to the paths in which the ends of the ducts reciprocate, so that during recoil, said grooves gradually move out of coincidence with the ducts and gradually reduce the sectional area of the outlets until the end of the groove is passed by the piston, when all flow will be cut off and the gun-barrel will be completely arrested. The presence of the grooves $a^1$, extending past the piston during recoil, necessitates closing such grooves as a means of communication from one side of the piston to the other; otherwise the ducts $b^1$, and their throttling means could not regulate the braking effect as described. This is the purpose of the projections $d^1$, corresponding in transverse area to and fitting in the grooves $a^1$, $a^1$. But again, it has been seen that the grooves are inclined to the path of the piston, and the projections, therefore, must move relatively to the piston. This in turn has been provided for by forming the projections on a rotatable ring D, which is the particular part to which the present invention appertains. The ring D, which has projections $d^1$ engaging in spiral grooves in the brake cylinder A, is rotatably mounted in an annular groove $b^3$ in the piston B. The groove $b^3$ is formed by a turned part on the side of the piston which is toward the piston-rod and by a disk F rigidly secured to the piston. A circular row of balls E is interposed between the ring D and the annular face $b^4$ of the piston B produced by the turning. The fluid passes from one side of the piston to the other through passages $b^1$ in the piston and through the grooves $a^1$ in the brake-cylinder. When, after firing, the piston B recoils in the direction of the arrow $x$ (Fig. 1), the projections $d^1$ slide along the walls of the spiral-grooves $a^1$ and turn the ring D relative to the piston B. The fluid-pressure, which by reason of the movement of the piston is created on the piston-rod side of the brake-cylinder A, acts on the projections $d^1$ of the ring D extending into the grooves $a^1$ and forces the ring against the annular face $b^4$ of the piston B through the medium of the balls E. Due to the balls E being inserted between the ring D and the piston B, the friction between the ring and its resisting bearing $b^4$ is effectively decreased and the wear on the walls of the grooves $a^1$ and on the projections $d^1$ which cause the ring to rotate is consequently equally decreased.

Although the invention is chiefly adapted for use for the recoil, as the forces acting during the recoil are considerably greater than those acting during the return movement, it is evident that the invention is not limited to such use. A row of balls might very well be interposed also between the ring D and the disk F which serves as resisting bearing for the ring D during the return movement.

It is apparent that rollers may be substituted for the balls E.

Having thus described the invention, what is claimed as new therein and desired to be secured by Letters Patent is:—

1. In a fluid brake, a brake-cylinder, a piston having a part engaging a part of the brake-cylinder and rotatable relative to the piston, and anti-friction means for said piston-part.

2. In a fluid brake, a brake-cylinder, a piston having a part engaging a part of the brake-cylinder and rotatable relative to the piston, and anti-friction means interposed between said piston part and the piston.

3. A fluid brake for recoil-guns having a brake-cylinder, a piston provided with a part engaging a part of the brake-cylinder and rotatable relative to the piston, and having a surface forming a resisting bearing for said piston-part during recoil, and anti-friction means interposed between said piston-part and said surface.

4. In a fluid brake for recoil guns, a piston having a part adapted to rotate relative to the piston during recoil, and a ball bearing for said piston part.

5. In a fluid brake, a brake-cylinder, a piston having a part engaging a part of the brake-cylinder and rotatable relative to another part of the piston, and anti-friction means between the said piston-parts.

6. A fluid brake for recoil-guns having a brake-cylinder, a piston provided with a part engaging a part of the brake-cylinder and rotatable relative to the piston, said piston provided with a surface forming a resisting bearing for said piston part during recoil, and anti-friction means interposed between said piston-part and said surface.

The foregoing specification signed at Barmen, Germany, this 10th day of September, 1908.

OTTO LAUBER.

In presence of—
  OTTO KÖNIG,
  W. W. BRUNSWICK.